UNITED STATES PATENT OFFICE.

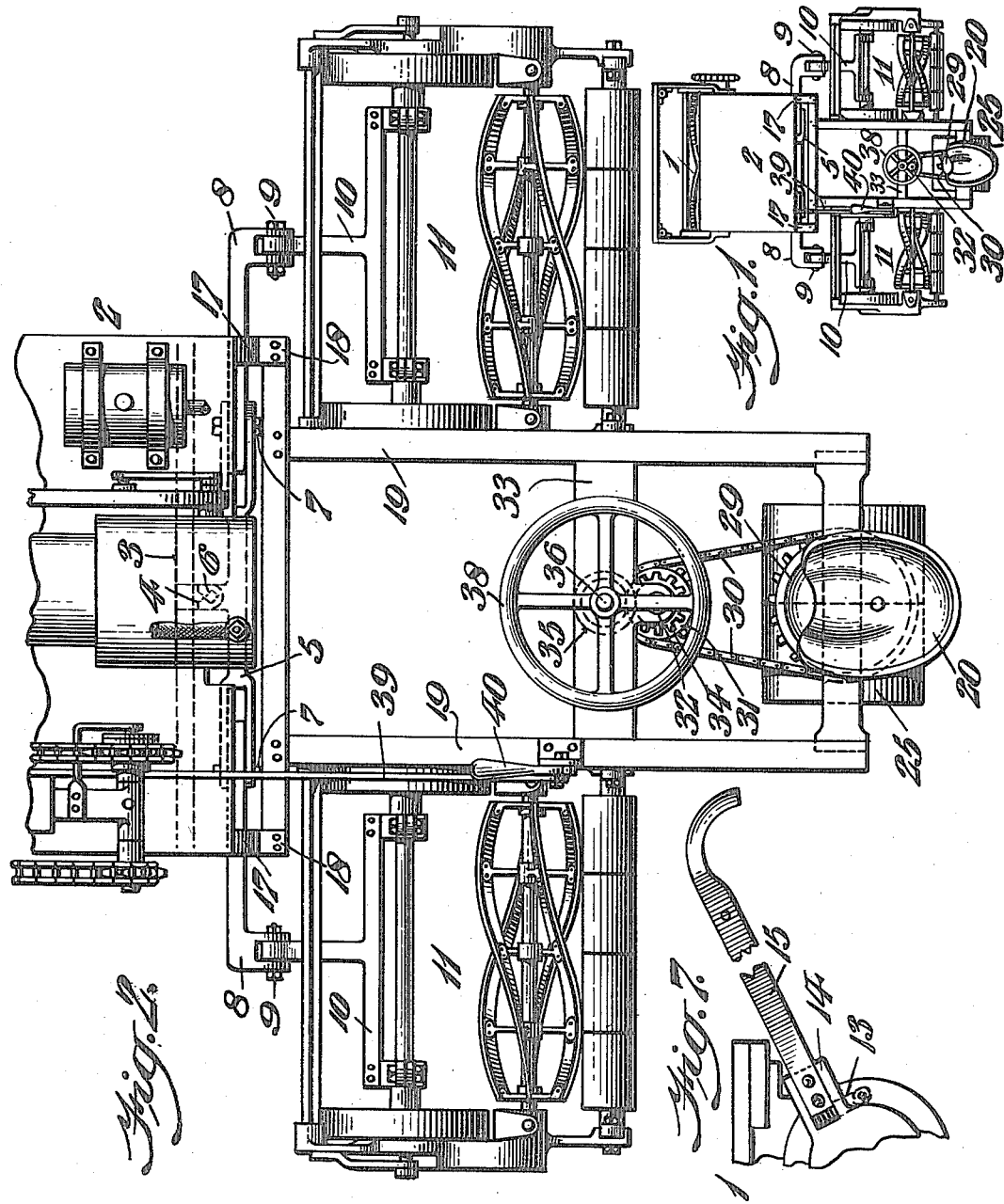

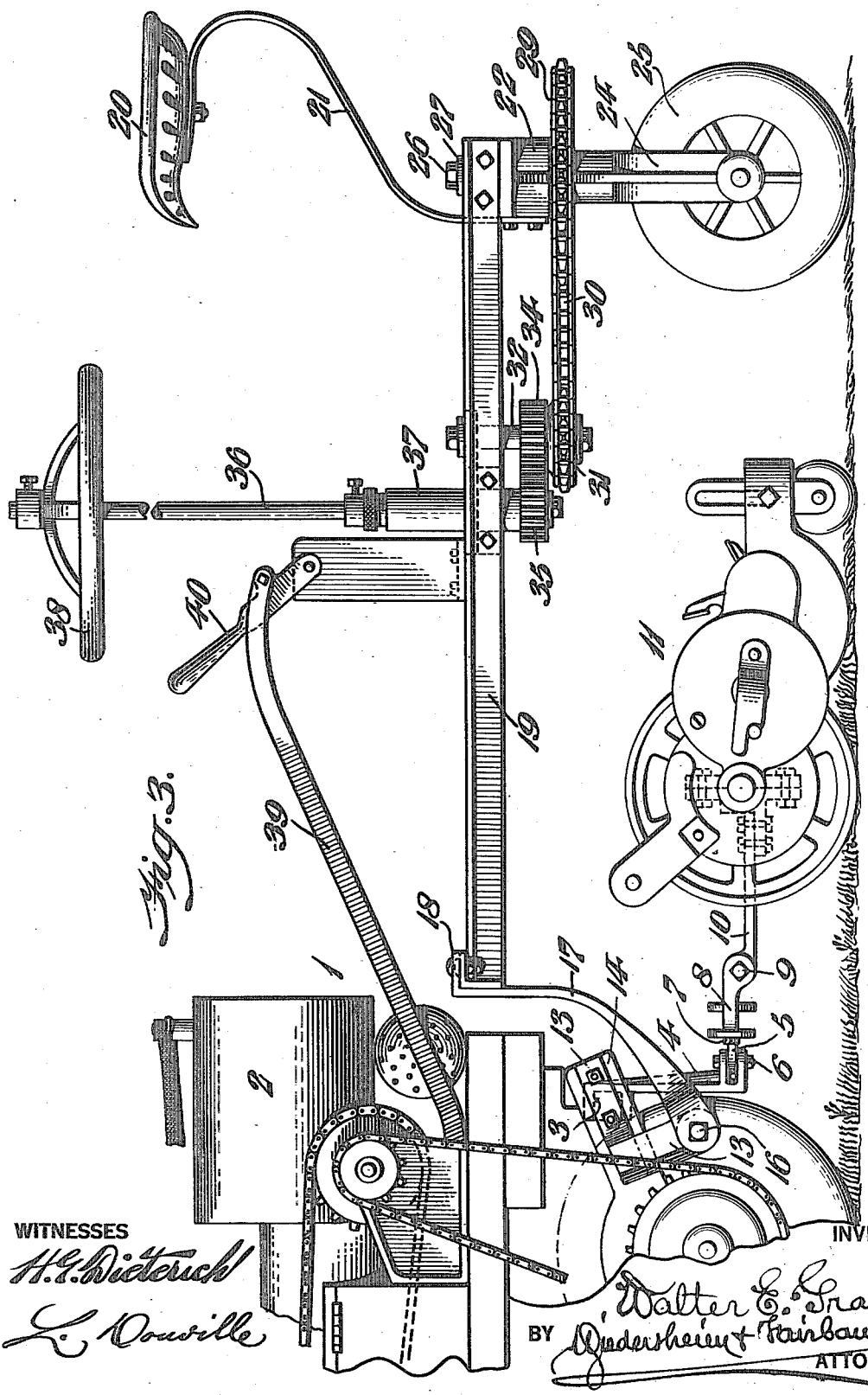

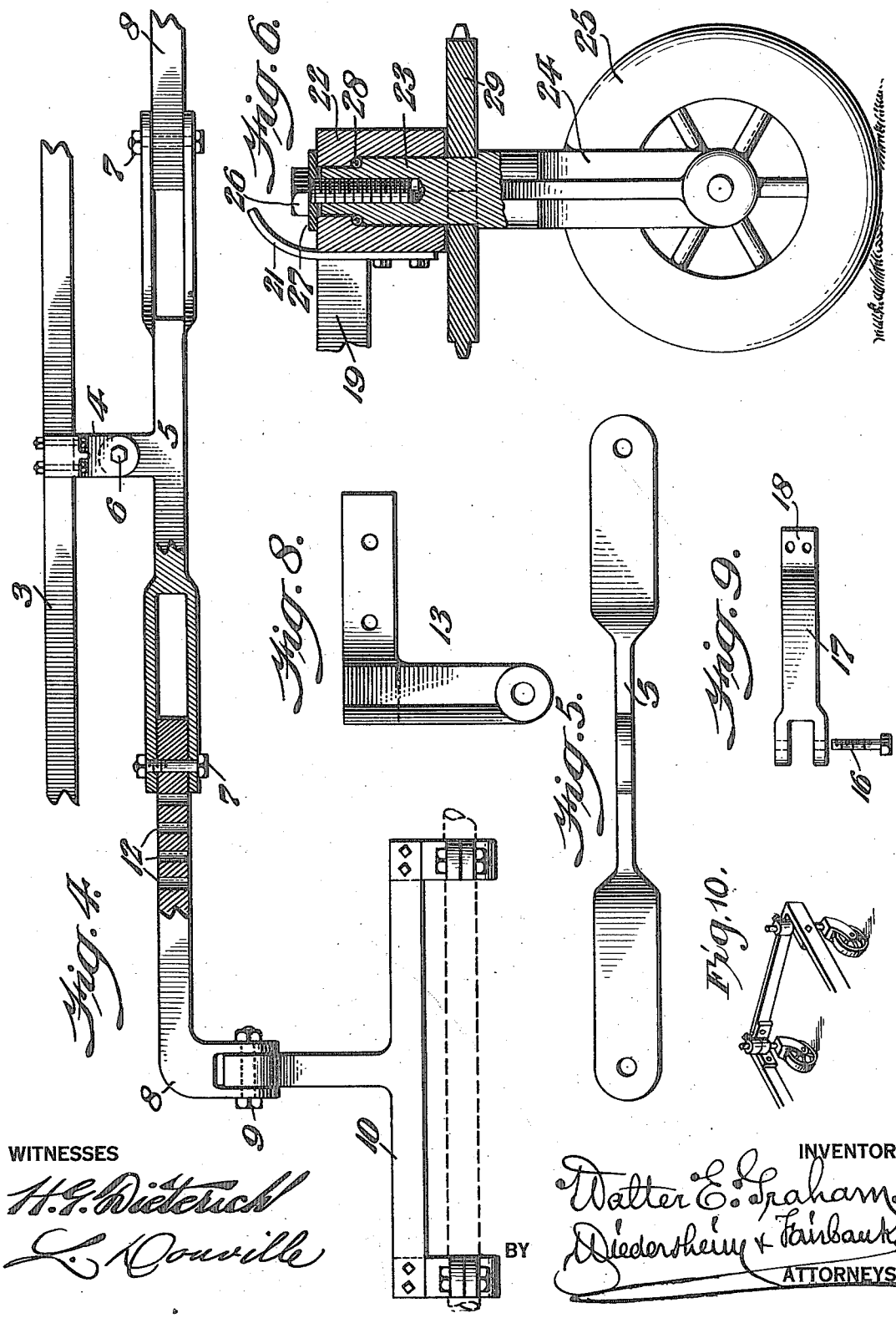

WALTER E. GRAHAM, OF PHILADELPHIA, PENNSYLVANIA.

LAWN-MOWER.

1,196,540.   Specification of Letters Patent.   Patented Aug. 29, 1916.

Application filed March 2, 1916. Serial No. 81,679.

*To all whom it may concern:*

Be it known that I, WALTER E. GRAHAM, a citizen of the United States, residing in the city and county of Philadelphia, State of Pennsylvania, have invented a new and useful Lawn-Mower, of which the following is a specification.

My invention consists of an improvement in a lawn mower involving a master mower or power unit motor, and a plurality of unit trailer mowers connected therewith producing a triplex motor mower for widening the swath that may be mowed, and consequently vastly increasing the extent of mowing.

It consists also of the connection with the master mower of steering mechanism of novel construction adapted to steer the triplicity of the mower.

The invention is satisfactorily illustrated in the accompanying drawing, but the important instrumentalities thereof may be varied, as long as they are included in the scope of the claims.

Figure 1 represents a diagrammatic view on a reduced scale of a lawn mower embodying my invention. Fig. 2 represents a top or plan view on an enlarged scale of the trailer mowers and steering mechanism, including a portion of the motor master mower. Fig. 3 represents a side elevation of the features shown in Fig. 2. Fig. 4 represents a top or plan view of detail portions of the connections employed for the master and trailer mowers. Fig. 5 represents a plan view of one of the beams of the device shown in Fig. 4. Fig. 6 represents a partial side elevation of the steering roller, and partial vertical section of the immediate steering mechanism connected with said roller. Fig. 7 represents a side elevation of a handle connection that may be employed to guide the master mower when so desired. Fig. 8 represents a side elevation of portions of members shown in Fig. 7. Fig. 9 represents a top or plan view of one of the brackets employed for connecting the steering mechanism with the master mower. Fig. 10 represents a perspective view on the scale Fig. 1, showing the casters employed for supporting the front of the frame of the master mower, and for steering purposes.

Similer numerals of reference indicate corresponding parts in the figures.

Referring to the drawings, 1 designates a master lawn mower which is connected with a mechanical motor 2, so that the mower may be designated as motor-driven.

On the rear of the housing or frame of said motor 2 is the cross arm 3 from which depends the bracket 4, from which extends the transversely-extending beam 5, which is pivotally connected with said bracket by the vertically-arranged bolt 6, whereby said beam may oscillate in horizontal direction on said arm 3 by the bolt 6 as its axis.

Connected with the ends of the beam 5 by the bolts 7 are the supplemental beams 8, and connected with rear extensions or elbows on the outer terminals of the latter by the bolts 9 are the frames 10 of the trailer mowers 11, it being noticed that the bolts 7 extend in horizontal direction forming horizontal axes for the beams 8 and consequently for the trailer mowers 11, and that the bolts 9 extend in horizontal direction at a right angle to the bolts 7 by which means the trailer mowers may have oscillating motions independent of each other, both on the axes formed by said bolts 7 and the axes formed by the bolts 9, so that said trailer mowers may accommodate themselves to irregularities of the ground.

Should it be desired to adjust the trailer mowers in lateral direction so as to set them nearer to or farther from each other, the supplemental beams 8 may have therein the openings 12 to receive the bolts 7 as said beams 8 are moved in or out relatively to the main beam 5.

It is apparent that when the master mower is advanced its cutter will be operated to effect the mowing operation thereof, and that the trailer mowers will follow said master mower, and their cutters will be operated, whereby grass will be mowed in a plurality of swaths causing an increase in the width of mowing without requiring separate power or draft for the trailers.

Connected with the sides of the frame of the master mower are the angular shaped ears 13, to whose upper limbs are attached the sockets 14 to which latter may be fitted and bolted the handles 15, these to be employed when it is desired to guide said master-mower by hand, say in cases where it is not desired by the operator to ride on the seat 20, or use the steering mechanism as such. Connected with said ears 13 by the bolts 16 are the lower ends of the brackets 17, said bolts 16 forming pivots or axes for said brackets, whereby the latter may rise and lower on said ears. The upper ends of said brackets 17 are formed with flanges 18 which are connected firmly with the frame 19 of the steering mechanism of the device, said mechanism being rearward of the master mower. On said frame 19 is the driver's seat 20, the same being connected with the arm 21, whose lower end is bolted to the boss 22 which is stationarily connected with the rear portion of said frame. In the bore of said boss is the rotatable head 23 of the fork 24 on which latter is mounted the roller 25 which is adapted to run on the ground for rolling the latter, it serving also as the means for steering the device or changing the direction thereof. As the brackets 17 may rise and lower turning on the ears 13 on the frame of the master mower, as has been stated, the roller 25 may also rise and fall with the frame 19, due to the inequalities or conditions of the ground.

The head 23 is held in position in the boss 22 by the bolt 26 and washer 27, the latter resting on said boss and overlapping the upper end of said head, the bolt passing through said washer into said head, said head 23 having ball bearings 28 on said boss, as most plainly shown in Fig. 6.

Keyed or otherwise secured to the head 23 below the boss 22 is the sprocket wheel 29 around which passes the sprocket chain 30, which latter passes around the sprocket wheel 31 whose shaft 32 is connected with a cross member 33 of the frame 19 and carries the pinion or gear wheel 34 with which meshes the pinion 35, which is carried by the steering shaft 36, whose bearing 37 is on the member 33 of the frame 19, said shaft having a hand wheel 38 which when rotated causes through the connected mechanism the movement of the roller 25 to the right or left so as to steer the device as required. Casters are applied to the front of the frame of the master mower for supporting the same and for steering purposes, when in the latter case they avoid gouging of the ground by the wheels of the mower, but these are well known in the art.

Connected with a proper part of the motor of the master mower is the arm 39 for operating said motor, said arm having connected with it the hand lever 40 which is within reach of the driver on the seat 20.

Having thus described my invention what I claim as new and desire to secure by Letters Patent, is:—

1. A master lawn mower, a main oscillatory beam connected with the frame of said mower and auxiliary oscillatory beams, and continuous laterally of said beam and jointed thereto, and a trailer mower jointed to each of said auxiliary oscillatory beams.

2. In a lawn mower, a master mower, a divided oscillatory beam connected with the frame of said master mower and composed of a main beam member, and oscillatory auxiliary beam members, the latter being pivotally connected with said main beam member at the side terminals thereof and forming lateral continuities thereof, and trailer mowers having oscillatory connections with said auxiliary beam members, said auxiliary and main beam members being provided with means for laterally adjusting said auxiliary beam members on said main beam member.

3. In a lawn mower, a master mower and a divided oscillatory beam connected by a vertical pivot with the frame of said master mower, said beam being composed of a main beam member and auxiliary beam members, the latter being connected by horizontal pivots with said main beam member at the side terminals thereof and forming lateral continuities thereof, said auxiliary beam members having extensions in a direction away from the master mower, and trailer mowers having oscillatory connection by horizontal pivots with said extensions.

4. A mower, a frame rearward thereof, a steering roller mounted on said frame, and means adapted to pivotally connect said frame with the frame of said mower adapting said roller to rise and lower.

5. A mower, a frame rearward thereof, a steering roller mounted on said frame, a bracket connected with said frame, and means for pivotally connecting said bracket with the frame of said mower.

6. A master lawn mower, a frame rearward thereof, an oscillatory beam connected with said mower, a trailer mower connected with said beam, a steering roller, a carrier for the shaft of said roller, a head on said carrier, a boss stationarily on said frame, said head being rotatably mounted therein, a wheel on said head, a steering shaft having its bearings on said frame, a pinion on said shaft, and gearing intermediate of said pinion and wheel.

7. A master lawn mower, a frame rearward thereof, an oscillatory beam connected with said mower, a trailer mower connected with said beam, a steering roller, a carrier for the shaft of said roller, a head on said carrier, a boss stationarily on said frame, said head being rotatably mounted therein, a wheel on said head, a steering shaft having its bearing on said frame, a pinion on said shaft, and gearing intermediate of said pinion and wheel, said boss having therein a ball bearing for said head.

8. In a lawn mower, an ear member on the housing thereof, a handle adapted to be fitted to and connected with said ear member, a bracket adapted to be pivotally mounted on said ear member, and a steering device rearward of the mower, the frame of said steering device being connected with said bracket.

WALTER E. GRAHAM.

Witnesses:
F. J. ENOS,
WILLIAM RITCHIE.